Feb. 4, 1941. M. CHERNOW 2,230,984
CLIP
Filed Dec. 6, 1940
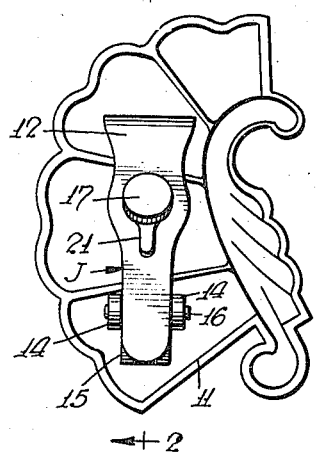
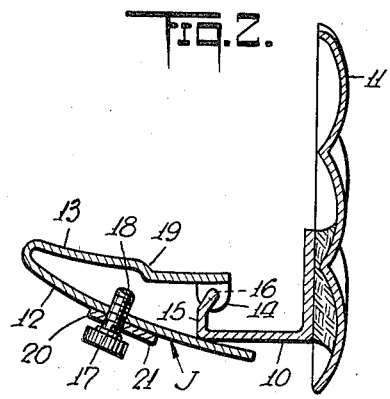
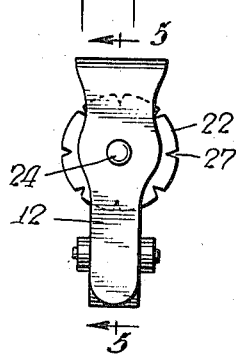
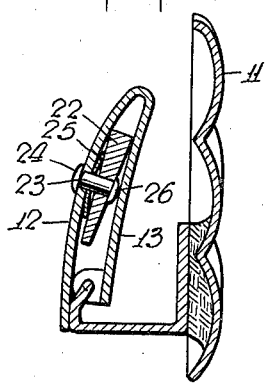
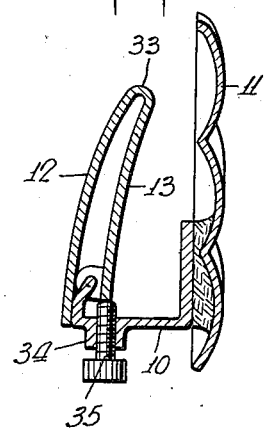
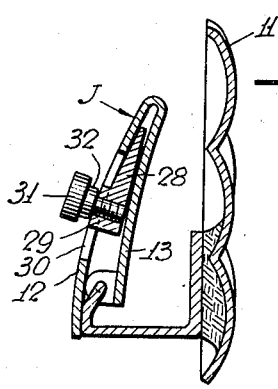
INVENTOR
*Michael Chernow*
BY
*Dean Fairbank & Hirsch*
ATTORNEYS Patented Feb. 4, 1941

2,230,984

UNITED STATES PATENT OFFICE 2,230,984

CLIP

Michael Chernow, New York, N. Y.

Application December 6, 1940, Serial No. 368,841

12 Claims. (Cl. 63—14)

The present invention relates to clips more especially of the type used for earrings.

As conducive to a clear understanding of the invention, it is noted that while clip earrings are easy to attach to the ear lobe, the fixed resilient clipping pressure thereof designed for the average ear leads to undue pressure and discomfort on a thicker ear lobe and to looseness and inadequate hold on a thinner lobe and moreover displacement or fatigue of the spring clip in time leads to looseness, even if the clip should initially fit with sufficient security and comfort.

An object of the present invention is to provide convenient inobstrusive and inexpensive means for readily adjusting the pressure exerted by earring clips of the type noted, to predetermined extent and to maintain such adjustment, so that the clip may be applied with the same facility as one devoid of the adjustment and will yet fit any ear lobe securely and with comfort.

In the accompanying drawing in which are shown one or more of various possible embodiments of the several features of the invention, Fig. 1 is a rear plan view showing one embodiment of the complete earring, Fig. 2 is a transverse sectional view taken on line 2—2 of Fig. 1 showing the clip unit in open position, Fig. 3 is a sectional view similar to that of Fig. 2 showing the clip in closed position, Fig. 4 is a view similar to Fig. 1 of the clip unit of a second embodiment, Fig. 5 is a view similar to Fig. 3 of the embodiment of Fig. 4, Fig. 6 is a view similar to Fig. 4 of a third embodiment, Fig. 7 is a view similar to Fig. 3 of the embodiment of Fig. 6, and Fig. 8 is a view similar to Fig. 3 of a still further embodiment.

The earring embodies a bracket 10 adapted to be soldered, riveted or otherwise attached to any earring body, face or plate 11. The clip jaw J is in the form of a reversely bent or hairpin shaped spring, the resiliency of which tends to close the outer leg 12 against the inner leg 13 thereof. The inner leg has integral hinge ears 14 which straddle the inturned ledge 15 of the bracket 10 that has pintle projections 16 extending through said eyes. The outer leg 12 extends along the bracket piece 10 in the open position of the clip, as shown in Fig. 2, in which position the legs of the hairpin shaped clip are spread by the ledge 15. When the clip is now hinged inward past the inner edge of the ledge 15, it snaps to the closed position shown in Fig. 3. The construction as thus far described is common to all the embodiments shown and is not my invention. The same reference numerals are used in all embodiments to designate said parts.

According to the invention, means is provided, adjustably to control the resiliency or movement of the spring clip J. In the three embodiments shown in Figs. 1 to 7, this is effected by limiting to predetermined extent the approach of the outer leg 12 of the clip to the inner leg 13 thereof, and thereby controlling the strength of the spring and the pressure exerted thereto.

In the embodiment of Figs. 1, 2 and 3, the adjustment member comprises a screw 17 threaded through the outer leg 12, with its shank extending between the two legs and its rounded pointed end 18 preferably aligned with a transverse rib 19 on the inner leg 13. Surrounding the shank at the outside thereof is a lock nut 20 with an extension arm 21 for ready manipulation thereof to lock the nut. The screw 17 being readily accessible may thus be easily adjusted to determine the pressure with which the clip grips the ear lobe. The greater the spread of outer leg 12 away from ledge 15 in the closed position shown in Fig. 3, the weaker the spring pressure exerted by the clip.

In the embodiment of Figs. 4 and 5, the means for spreading the outer leg of the clip outwardly constitutes a wedge piece, in the form of a wedge-shaped disk 22 lodged between the two legs 12 and 13 of the clip. Disk 22 is affixed to one of the legs and readily accessible to permit ready adjustment of said disk. Preferably the disk is carried by the outer leg 12 and the carrying means comprises a rivet 23 headed over the outer leg at 24 and at 26 headed over the disk. A bowed metal washer 25 is interposed between the outer face of the wedge disk 22 and the leg 12. The disk 22 is of diameter to protrude laterally as shown, beyond the sides of the clip, so that it may readily be turned in the manner of a dial to dispose any predetermined part thereof in the uppermost position in Fig. 5, and thereby adjustably determine the divergence of the outer leg 12 with respect to the inner leg 13. To facilitate manipulation by the finger nail, the periphery of disk 22 is radially slit at 27 or if desired it may be milled. By reason of the resilient pressure exerted through the spring washer 25 the wedge-shaped disk remains in any adjusted position, to maintain the clip pressure at the preset value.

In the embodiment of Figs. 6 and 7 there is shown a sliding instead of a rotating wedge member. This sliding wedge member 28 extends between the legs 12 and 13 of the clip member J and has a ridge 29 keyed in a longitudinal slot 30 in the outer leg member 12. Threaded into said ridge is a combined handle and clamping screw 31. The screw may readily be loosened and the wedge piece pushed to spread the outer leg 12 outward to desired extent, and thereupon the screw piece may be readily tightened to cause its head 32 to exert pressure against the face of the outer clip leg member.

The embodiment of Fig. 8 is on a somewhat different principle. Here the spreading of the legs of the clip is not varied for adjustment, but means is provided to limit the approach of its effective clamping end 33 with respect to the earring face. For this purpose, the bracket 10 is provided with a hub 34 aligned with the length of the inner leg 13 and accommodating a screw 35 which may be turned by hand, for its inner end to serve as a limiting stop for the inner end of leg 13 of the clip and, therefore, to determine the approach of such clip toward the face of the earring. A lock nut (not shown) may of course be and preferably is provided, similar to that shown in Fig. 2, to maintain the screw locked in any position of adjustment.

It is noted that as the metal of the spring clip becomes fatigued, adjustment may readily be effected in each of the embodiments shown, to re-establish the desired pressure, which pressure is maintained without the need for adjustment in applying the earring to the ear lobe. Also, the pressure may be adjusted by the wearer at any time during the day without the need for removing the article from the ear to loosen or tighten the grip, for security and comfort under varying conditions.

It is understood that the clip unit in any of its various embodiments made up of the bracket, the spring clip and the associated adjustment feature, may be made as an article of manufacture apart from the earring body, face or plate and applied thereto by soldering or riveting as desired.

As many changes could be made in the above article and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. An earring of the clip type including a body, a hairpin spring jaw, a bracket on said body to which one leg of said jaw is hinged, the other leg pressing against said bracket and biased toward the body; the combination therewith of a manually operable member adjustable to determine the resilient clamping pressure exerted by the spring jaw.

2. An earring of the clip type including a body, a bracket, a hairpin spring jaw, a bracket on said body to which one leg of said jaw is hinged, the other leg pressing against said bracket and biased toward the body; the combination therewith of a manually adjustable member adapted to adjust the spread between the legs of the hairpin jaw, thereby to determine the pressure exerted thereby.

3. An earring of the type including a bracket and a hairpin type spring jaw having one leg hinged to said bracket and the other pressing upon the bracket and biased toward the body; the combination therewith of a spreading member extending between the two legs of the hairpin clip and manually adjustable to fixed predetermined position to vary the pressure exerted by the spring jaw.

4. An earring of the type comprising a body, a bracket affixed thereto having a hairpin spring clip jaw hinged thereto at one leg thereof, the companion leg extending over the bracket and in contact therewith and biasing the jaw toward the body; the combination therewith of a member for adjusting the position of the outer leg with respect to the bracket and thereby reducing the resilient pressure exerted thereby.

5. The combination recited in claim 4 in which the adjusting member is carried by the outer leg and is adapted to exert thrust pressure against the inner leg.

6. An earring of the type comprising a body, a bracket affixed thereto having a hairpin spring clip jaw hinged thereto at one leg thereof, the companion leg extending over the bracket and in contact therewith and biasing the jaw toward the body; the combination therewith of a rotatable member affixed to the outer leg, extending between said legs and exerting thrust pressure against the inner leg, thereby to permit divergence of the outer leg away from said bracket to selected extent with corresponding determination of the clasping pressure exerted by said clip.

7. An earring of the type comprising a body, a bracket affixed thereto having a hairpin spring clip jaw hinged thereto at one leg thereof, the companion leg extending over the bracket and in contact therewith and biasing the jaw toward the body; the combination therewith of a wedge member extending between the legs of said spring clip jaw and means protruding from said jaw to permit finger adjustment thereof for displacing the outer leg outwardly from said bracket to predetermined extent.

8. An earring of the type comprising a body, a bracket affixed thereto, having a hairpin spring clip jaw hinged thereto at the inner leg thereof, the outer leg extending over the bracket and in contact therewith and biasing the jaw toward the body; the combination therewith of a screw threaded through the outer leg of said hairpin shaped jaw and adapted to abut the inner leg of said jaw to permit displacement of the outer leg to predetermined extent by the setting of said screw.

9. A clip unit for an earring, comprising a bracket adapted to be affixed to the face of the earring and having a pintle at one end, a hairpin shaped spring clip having ears hinged over said pintle, the outer leg of said jaw extending over the end of said bracket and biasing said jaw to clipping position, a screw threaded through said outer leg, a rib on said inner leg for engagement by the point of said screw and a lock nut about the shaft of said screw for locking said screw in any position of adjustment thereof.

10. An earring of the type comprising a body, a bracket affixed thereto having a hairpin spring clip jaw hinged thereto at the end of one leg thereof, the end of the companion leg extending over the bracket and in contact therewith and biasing the jaw toward the body; the combination of a wedge-shaped disk disposed between the legs of said clip, riveted to one of said legs and accessible laterally of said jaw for adjustment thereof.

11. An earring of the type comprising a body, a bracket affixed thereto, having a hairpin spring clip jaw hinged thereto at the inner leg thereof, the outer leg extending over the bracket and in contact therewith and biasing the jaw toward the body; the combination therewith of a disk wedge-shaped in cross-section, disposed between the legs of said jaw and riveted to said outer leg of the jaw and having an indented periphery protruding beyond said jaw, and a bowed spring extending under the inner head of said rivet to react against said disk and urging the same from the outer leg for resilient retention thereof in any adjusted position.

12. An earring of the type comprising a body, a bracket affixed thereto having a hairpin spring clip jaw hinged thereto at the inner leg thereof, the outer leg extending over the bracket and in contact therewith and biasing the jaw toward the body; the combination therewith of a wedge piece extending between the legs of said jaw and having a ridge extending through a longitudinal slot in the outer jaw, a handle piece carried upon said ridge and protruding through said slot, said handle piece having a head adapted frictionally to grip the face of the outer leg and retain the wedge piece in any predetermined position.

MICHAEL CHERNOW.